United States Patent [19]

Stallard, III

[11] Patent Number: 4,819,971

[45] Date of Patent: Apr. 11, 1989

[54] PRESSURE VESSEL PENETRATION FITTING

[75] Inventor: Clinton W. Stallard, III, Hampton, Va.

[73] Assignee: Newport News Shipbuilding and Dry Dock Company, Newport News, Va.

[21] Appl. No.: 92,401

[22] Filed: Sep. 2, 1987

[51] Int. Cl.[4] ............................................... F16L 5/00
[52] U.S. Cl. ................................. 285/131; 285/137.1; 285/189
[58] Field of Search .................... 285/131, 132, 137.1, 285/189, 192, 286, 133.1

[56] References Cited

U.S. PATENT DOCUMENTS

| | | | |
|---|---|---|---|
| 816,559 | 4/1906 | Connolly | 285/132 X |
| 1,614,770 | 1/1927 | Ayling | 285/137.1 X |
| 2,813,692 | 11/1957 | Bremer et al. | |
| 2,846,246 | 8/1958 | Peras. | |
| 3,052,452 | 9/1962 | Taga | 285/132 |
| 3,216,749 | 11/1965 | Summerfield | 285/189 X |
| 3,441,662 | 5/1967 | Augenstein et al. | |
| 3,735,024 | 5/1973 | Walker, Sr. | |
| 3,825,320 | 7/1974 | Redfern. | |
| 3,856,983 | 12/1974 | Fisher et al. | |
| 3,934,787 | 1/1976 | Fels | 285/189 X |
| 3,951,515 | 4/1976 | Allard. | |
| 4,262,913 | 4/1981 | Parfree et al. | |
| 4,728,420 | 3/1988 | Abercia, Jr. | 285/137.1 X |

FOREIGN PATENT DOCUMENTS

| | | | |
|---|---|---|---|
| 58394 | 3/1977 | Australia | 285/137.1 |
| 3003067 | 7/1981 | Fed. Rep. of Germany | 285/137.1 |
| 3003065 | 7/1981 | Fed. Rep. of Germany | 285/131 |

Primary Examiner—Randolph A. Reese
Assistant Examiner—Anthony Knight
Attorney, Agent, or Firm—Lalos & Keegan

[57] ABSTRACT

A penetration fitting for passing pipes, cables, wires, etc., through a shell or wall that forms a pressure boundary. The combination of a penetrator that is solid metal except for pressure boundary channels, and a single compensating sleeve permits a relatively large number of pipes to be brought across a relatively small area of a vessel shell or wall while still maintaining the structural integrity of the vessel shell or wall.

19 Claims, 2 Drawing Sheets

PRESSURE VESSEL PENETRATION FITTING

BACKGROUND OF THE INVENTION

The present invention is related to fittings or connectors for passing pipes, cables, wires, etc., through a shell or wall that forms a pressure boundary.

Specifically, the present invention is directed to a vessel penetration fitting that enables a relatively large number of pipes to be brought across a pressure boundary, e.g., a vessel shell, in a relatively small area while still maintaining the structural integrity of the vessel shell or wall.

In prior art fittings, the number of penetrations in a given area is limited because each shell penetration and related fitting requires an individual compensating sleeve. A compensating sleeve surrounds the fitting compensating for the penetration and distributing the structural and pressure stresses around the hole in the shell. Pressure boundary integrity may be compromised if many penetrations are concentrated in a limited area. Further, prior art arrangements requiring each penetration, fitting and sleeve to be treated as a separate pressure boundary crossing increase both material costs and labor.

It is an object of the present invention to provide a penetration fitting that will enable a relatively large number of pipes or conduits to be brought across a pressure boundary in a relatively small area.

It is another object of the invention to provide a number of penetrations in a small area of a vessel shell while still maintaining the structural integrity of the shell.

A further object of the present invention is to provide a penetration fitting for a number of pipes or conduits using a single compensating sleeve.

These and other objects of the invention will become more readily apparent from the following detailed description.

DETAILED DESCRIPTION

Figure 1:
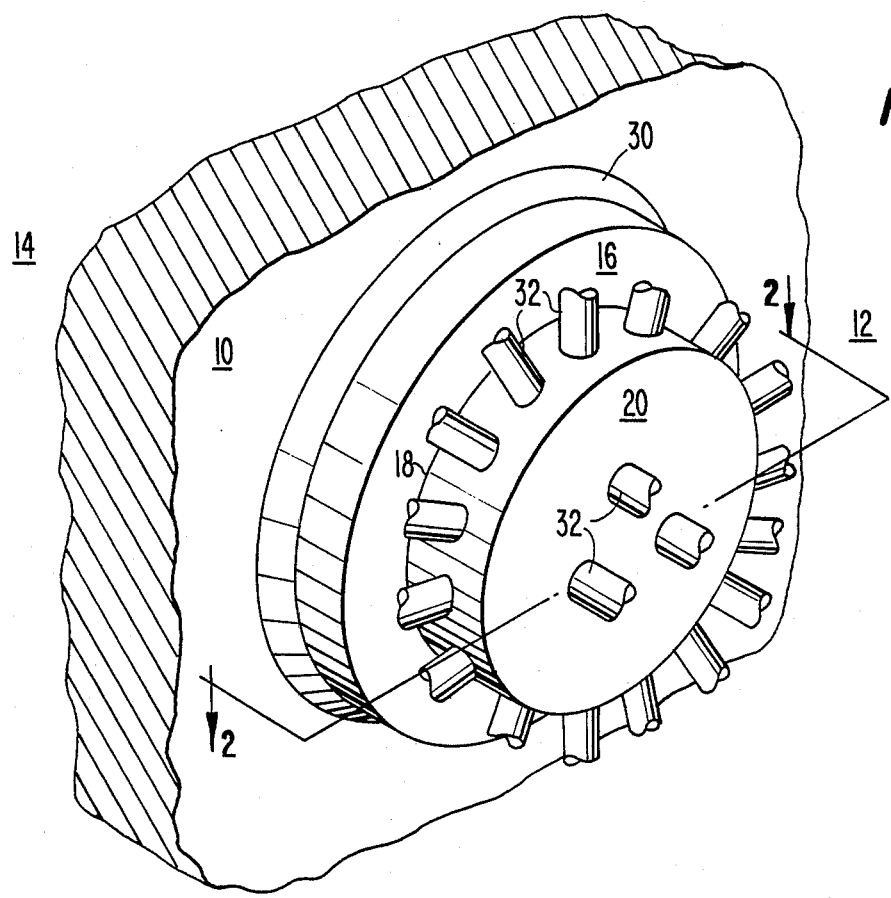
FIG. 1 is a perspective view showing the vessel shell or wall, the compensating sleeve, penetration fitting, and pipes extending therethrough.
Figure 2:
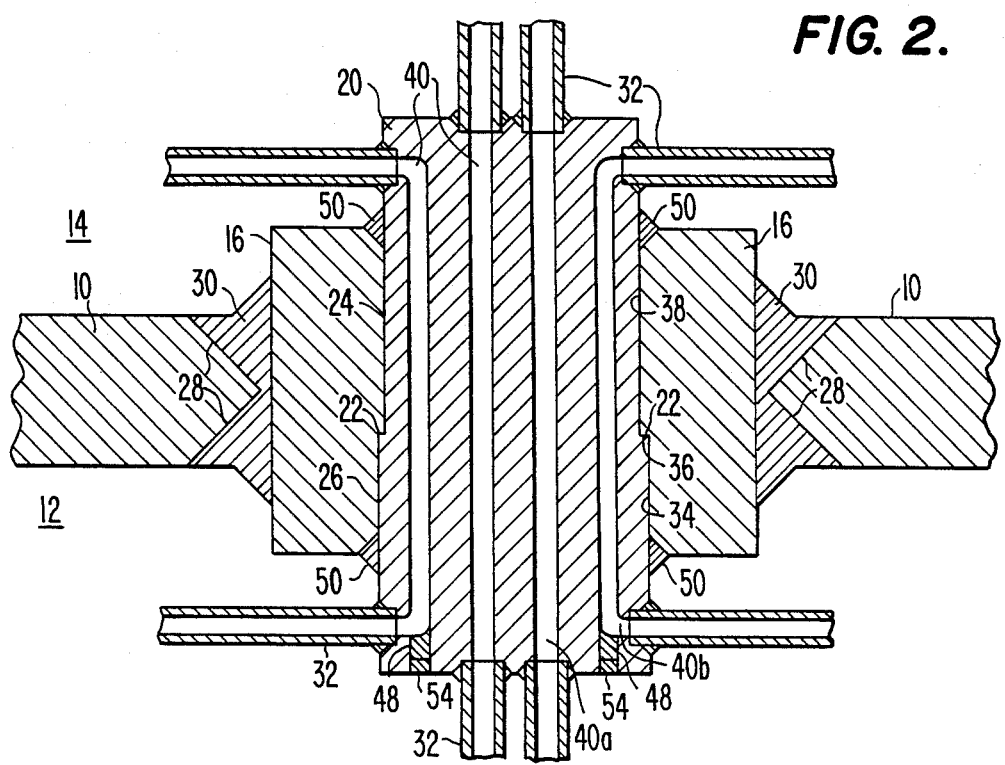
FIG. 2 is a cross-section of the shell, fitting, and sleeve taken along the line 2—2 of FIG. 1 according to one embodiment of the present invention.

Referring to FIG. 1, a section of a shell 10 of a pressure vessel is shown separating a high pressure medium 12, e.g., a liquid at a high pressure, from a lower pressure medium 14, e.g., the atmosphere. Typically, the shell 10 will consist of some thickness of metal plating which must be cut or drilled to provide an aperture to receive compensating sleeve 16, as shown in FIGS. 1 and 2.

Compensating sleeve 16 is a thick walled cylindrical section manufactured from a material having generally the same physical and chemical properties as the vessel shell 10 in which it will be installed. The thick walled compensating sleeve 16 compensates for the hole in the shell and structural and pressure stresses around the hole. The inner diameter 18 of sleeve 16 is sized to accept penetrator 20, as shown in FIGS. 1 and 2.

The inner diameter 18 (FIG. 1) of sleeve 16 may be provided with an anti-extrusion step 22 (FIG. 2) to inhibit penetrator 20 from being extruded to the low pressure side 14 of the vessel. Sleeve 16 will have a smaller inner diameter 24 and a larger inner diameter 26 with the anti-extrusion step 22 being formed at the intersection of the two. Step 22 serves to prevent displacement of penetrator 20 and also serves to properly position penetrator 20 within sleeve 16.

The compensating sleeve 16 is installed in shell 10 by cutting an aperture with beveled edges 28 in the shell plating in accordance with standard welding practices. The beveled edges 28 may be formed in the shell on both the high pressure side 12 and low pressure side 14 of the vessel shell 10. The compensating sleeve 16 is positioned in the shell aperture with the smaller inner diameter 24 of sleeve 16 located at the low pressure side 14 of the shell. The sleeve 16 is positioned such that the centerline of the thickness or depth dimension of shell 10 bisects the length of the sleeve 16. The sleeve 16 is thereby positioned midway through the shell 10. Sleeve 16 is then welded into place using a welding procedure and filler metal 30 appropriate to the specific shell and sleeve material in a given application.

Pipes 32 are passed across the pressure boundary and through shell 10 and sleeve 16 via penetrator 20. Unlike the pressure boundary penetrators or fittings of the prior art, the penetrator of the present invention enables multiple pipes to cross the pressure boundary formed by the shell while requiring only a single compensating sleeve.

The penetrator 20 of the present invention comprises a solid cylindrical metal section that is weld compatible with both compensating sleeve 16 and piping 32 that will be attached to the penetrator 20. The solid metal penetrator 20 is designed to cooperate with a single compensating sleeve 16 to ensure pressure boundary integrity while permitting a number of conduits or channels to cross the boundary. The penetrator 20 is formed, for example, by machining to closely fit with compensating sleeve 16. The outer diameters 34 and 38 (FIG. 2) may be 0.010" smaller than the inner diameters 26 and 24 respectively of sleeve 16.

An anti-extrusion step 36 may be formed in penetrator 20 to match step 22 in sleeve 16. The length of the penetrator 20 is chosen so that the penetrator extends beyond the length of the compensating sleeve 16 on both the low pressure 14 and high pressure 12 sides of the shell 10. The length of the compensating sleeve 16 will be chosen according to the shell 10 thickness and working pressure of the vessel in which sleeve 16 will be installed. The extension or stand-out of penetrator 20 beyond the length of sleeve 16 on each end will depend on the application and may be, for example, 1½" plus the diameter of the largest pipe 32 to be attached to penetrator 20.

Figure 4:
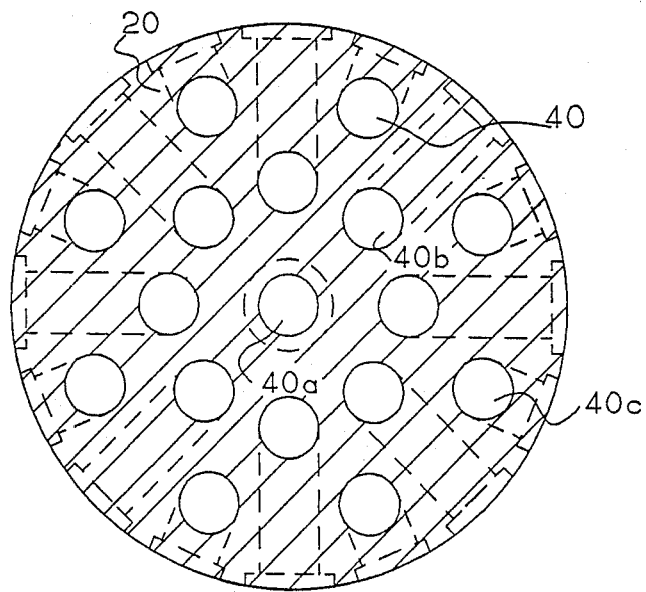
FIG. 4 is an end view of the fitting taken along the line of 4—4 of FIG. 3.

Penetrator 20 is drilled to provide a plurality of channels or conduits through it so that pipes or cables can be attached on both the high and low pressure sides of shell 10. Fluids, gases, cables, etc., can then be brought safely across the pressure boundary through penetrator 20. The projected channels 40 through penetrator 20 may be spaced in a pattern as shown in FIG. 4. The number of pipes 32 that can be connected to penetrator 20 and the number of corresponding channels 40 that can be drilled through penetrator 20 is of course limited by the size of the penetrator 20 and also by considerations of strength and structural integrity.

The diameters of the channels or holes 40 may be drilled to match the inner diameters of the pipes 32 that will be connected to penetrator 20. The channels or holes 40 are drilled in both end surface 42 and side surface 44 of penetrator 20 (FIG. 3) such that no channel is drilled closer to the edges of penetrator 20 than 1.2 times the wall thickness of pipes 32 plus the hole radius plus a distance dictated by the method of attachment of pipes 32 to penetrator 20.

The center-to-center distance between any two channels or holes 40 is chosen according to criteria of strength and access for welding. In one embodiment, it is 1.2 times the wall thickness of the thickest of pipes 32 to be connected to each channel 40 plus the sum of the radii of the two channels 40. Selection of the number, size, and placement of channels 40 through penetrator 20 ensures the maximum number of pressure boundary crossings for a given area. The penetrator 20 of the present invention provides a major improvement over prior art fittings by providing a plurality of pressure boundary crossings in a limited area of the vessel shell 10 without sacrificing its structural integrity.

Figure 3:
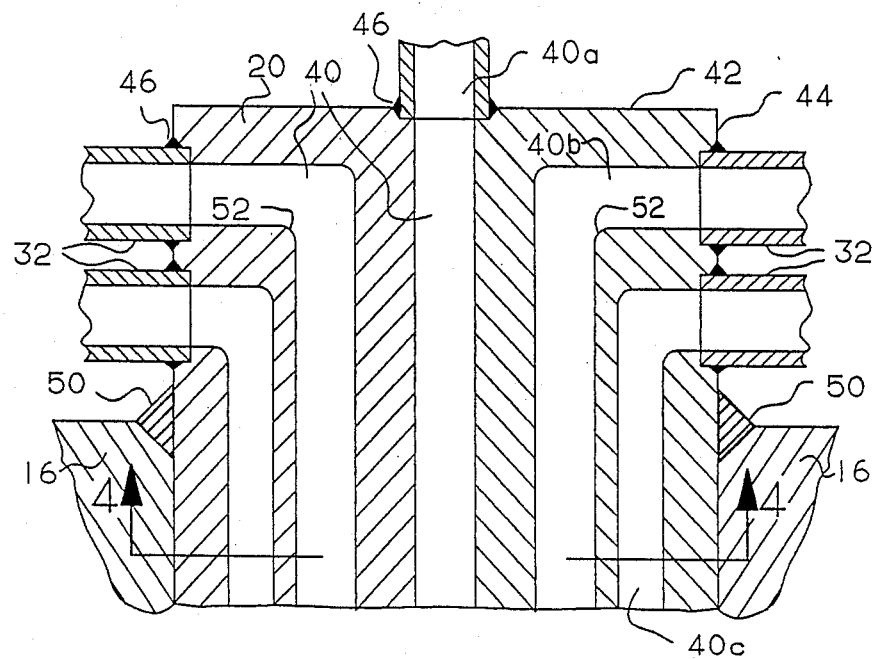
FIG. 3 is a cross-section of the shell, fitting, and sleeve according to another embodiment of the present invention.

As shown in FIGS. 2 and 3, channels 40 can extend straight through the ends of penetrator 20 as shown by channel 40a or out through the sides of penetrator 20 as shown by channel 40b. FIGS. 1 and 2 illustrate one embodiment of penetrator 20 in which only one set of pipes 32 extends from the side of penetrator 20. FIGS. 3 and 4 illustrate a second embodiment of penetrator 20 which increases the number of available channels 40 by providing a second set of channels 40 extending through the side of penetrator 20 shown, for example, as channel 40c in FIGS. 3 and 4. In further embodiments there could be three or even more sets of side channels. In the embodiment of FIGS. 3 and 4, the extension length of penetrator 20 beyond the length of sleeve 16 will be increased by the diameter of the largest pipe(s) in the additional row(s) of side channels 40c added to penetrator 20 plus spacing between the rows as appropriate to the size of pipes 32 and the need for access for a given attachment method.

The channels or holes 40 are drilled in the pattern shown in FIG. 4 from the large diameter 34 end (FIG. 2) of penetrator 20. The channels 40a with end ports are drilled completely through while channels 40b with side ports are drilled to a depth sufficient to maintain the structural integrity of the penetrator 20. In one embodiment, the hole is drilled to a depth sufficient to maintain a distance of 1.2 times the pipe wall thickness plus the pipe radius plus a distance dictated by the method of attachment of pipe 32 to penetrator 20 between the end of the hole 40 and the end of surface 42 of penetrator 20. Channels 40c with side ports are drilled a distance relative to the distance of channels 40b such that the corresponding side port channels meet channel center-to-center restrictions previously discussed. All channels 40b and 40c with side ports are finished with a round bottom tool to provide a spherical surface at the blind end of channels 40b and 40c.

Pipes 32 may be attached to penetrator 20 by any common practice such as screwing or welding. In FIG. 3 the pipes 32 are shown attached by socket welds 46. The entrances of all channels 40 are counterbored, shown in FIG. 3, to prepare the entrance for the socket weld 46. The penetrator 20 is then drilled with side channels to intersect the straight section of channels 40b and 40c. The diameters of the side channels are selected to match the diameters of the straight section of channels 40b and 40c that they will be intersecting. The centers of the side sections of channels 40b are located such that the side section will intersect the straight section of channels 40b. A ball end mill may be used to form a smooth 90° transition within the penetrator. Side channel sections are similarly drilled and milled to intersect the straight sections of channels 40c.

Next in the penetrator 20 manufacturing process, a number of plugs 48 (FIG. 2) are made from the same material as penetrator 20 with a length equal to the distance between the end face of penetrator 20 and the center of radial holes 40b less a distance dictated by consideration of strength of the weld which will hold it in place. The length of plugs 48 for channels 40c, if used, will of course be appropriately longer. The plugs 48 are machined to an interference fit within the channels 40b and 40c for which they are intended and then put into place by pressing into the hole until the inner end is at the center of radial holes 40b or 40c. The outer end will be inset below the surface by the distance just noted. Plug 48 is then penetration welded into place by weld 54, filling this depression flush with the surface.

The side sections of channels 40b and 40c are finished with a ball end mill to machine the intruding end of plugs 48 to form a smooth 90° transition. A "U" shaped passage is thereby formed in the penetrator for each channel 40b or 40c with side ports. All side and end channel openings are then further machined to provide penetration weld preparation for the pipes 32 to be attached to channels 40. The inside corners 52 of the intersections of the side sections and straight sections of channels 40b and 40c may be broken and blended to provide smooth fluid flow through the transition area of the two sections.

Penetrator 20 is inserted into sleeve 16 from the high pressure 12 side of shell 10 such that penetrator 20 rests on anti-extrusion step 22 of sleeve 16. Penetrator 20 is then welded to sleeve 16 on both the low pressure 14 and high pressure 12 sides of sleeve 16 using an appropriate weld procedure and filler metal 50.

Piping 32 is then welded to the side and end channel 40 openings on the low pressure 14 side of penetrator 20 and to the high pressure 12 side stub piping to form a complete piping system. Weld integrity is verified by appropriate nondestructive testing and hydro testing of both the vessel and completed piping system.

From the foregoing description, it can be seen that the combination of the penetrator and compensating sleeve of the present invention provides advantages over the prior art in structural integrity, number of pressure boundary crossings per given area, cost of manufacture, and installation time. While the present invention has been described in terms of pipes crossing a vessel shell boundary, many modifications and variations are possible in which the present invention could be used, for example, in the pressurized cabin of an airplane or to pass cables, fluids, or gases through the pressure vessel of a nuclear reactor.

I claim:

1. Apparatus for providing a plurality of channels across a pressure boundary, comprising:
    a wall forming said pressure boundary, said wall including an aperture;
    cylindrical sleeve received within said aperture and mounted to said wall to compensate for said aperture and distribute structural and pressure stresses in the vicinity of said aperture, said sleeve being made of material that can be welded to said wall;

a penetrating means received within said sleeve, said penetrating means including a plurality of channels passing through said penetrating means, whereby said channels pass across said pressure boundary, and said penetrating means comprising a cylinder that is solid except for said plurality of channels, said penetrating means being made of material that can be welded to said sleeve;

and wherein at least one of said channels extends through a side of said cylinder on each of two ends of said cylinder, one of said ends being located on a low pressure side of said pressure boundary and a second one of said ends being located on a high pressure side of said boundary.

2. Apparatus according to claim 1 in which said sleeve includes a first section with a first inner diameter and a second section with a second inner diameter smaller than said first inner diameter, whereby a step is formed between said first and second sections.

3. Apparatus according to claim 2 in which said penetrating means includes a first portion with a first outer diameter and a second portion with a second outer diameter larger than said first outer diameter, whereby a step is formed between said first and second portions, and whereby said step in said sleeve and said step in said penetrating means cooperate when said penetrating means is received in said sleeve to inhibit said penetrating means from being extruded toward a low pressure side of said pressure boundary.

4. Apparatus according to claim 1 in which at least one of said channels extends completely through said cylinder in a straight line.

5. Apparatus according to claim 1 including at least a second one of said channels extending through a side of said cylinder on each of said two ends, said second one of said channels extending through a side of said cylinder at a greater distance from said ends than said first one of said channels.

6. Apparatus according to claim 1 in which conduits are attached to said penetrating means at channel openings in said penetrating means.

7. Apparatus according to claim 6 in which said channels have a generally circular cross-section and each of said channels is separated from its adjacent channels by a predetermined distance.

8. Apparatus according to claim 7 including at least two channels and said predetermined distance separating any two channels is at least as great as the wall thickness of the thickest of said conduits attached to said two channels plus the sum of the radii of said two channels.

9. Apparatus according to claim 1 in which said compensating means has a predetermined length and said penetrating means extends beyond said length of said compensating means on both a low pressure side and a high pressure side of said pressure boundary.

10. A vessel shell penetrating assembly comprising:
a cylindrical compensating sleeve received within an opening in said shell to compensate for said opening and to distribute stresses in the vicinity of said opening caused by a pressure differential between a low pressure side and a high pressure side of said shell;

a penetrating means received within said compensating sleeve, said penetrating means consisting of a cylinder that is solid except for a plurality of channels extending through said penetrating means from said low pressure side to said high pressure side of said shell;

and wherein at least one of said channels extends completely through said penetrating means in a straight line and at least a second one of said channels extends through a side of said penetrating means on each of two ends of said penetrating means, one of said ends being located on said low pressure side of said shell and a second one of said ends being located on said high pressure side of said shell.

11. A shell assembly according to claim 10 in which said sleeve includes a first section with a first inner diameter and a second section with a second inner diameter smaller than said first inner diameter, whereby a step is formed between said first and second sections.

12. A shell penetrating assembly according to claim 11 in which said penetrating means includes a first portion with a first outer diameter and a second portion with a second outer diameter larger than said first outer diameter, whereby a step is formed between said first and second portions, and whereby said step in said sleeve and said step in said penetrating means cooperate when said penetrating means is received in said sleeve to inhibit said penetrating means from being extruded toward said low pressure side of said shell.

13. A shell penetrating assembly according to claim 10 in which said sleeve is made of material that can be welded to said shell.

14. A shell penetrating assembly according to claim 13 in which said penetrating means is made of material that can be welded to said sleeve.

15. A shell penetrating assembly according to claim 10 including at least a second one of said channels extending through a side of said penetrating means on each of said two ends, said second one of said channels extending through a side of said penetrating means at a greater distance from said ends than said first one of said channels.

16. A shell penetrating assembly according to claim 10 in which conduits are attached to said penetrating means at channel openings in said penetrating means.

17. A shell penetrating assembly according to claim 16 in which said channels have a generally circular cross-section and each of said channels is separated from its adjacent channels by a predetermined distance.

18. A shell penetrating means according to claim 17 including at least two channels and said predetermined distance separating any two channels is at least as great as the wall thickness of the thickest of said pipes attached to said two channels plus the sum of the radii of said two channels.

19. A shell penetrating assembly according to claim 10 in which said compensating sleeve has a predetermined length and said penetrating means extends beyond said length of said sleeve on both said low pressure side and said high pressure side of said shell.

* * * * *